Patented July 10, 1934

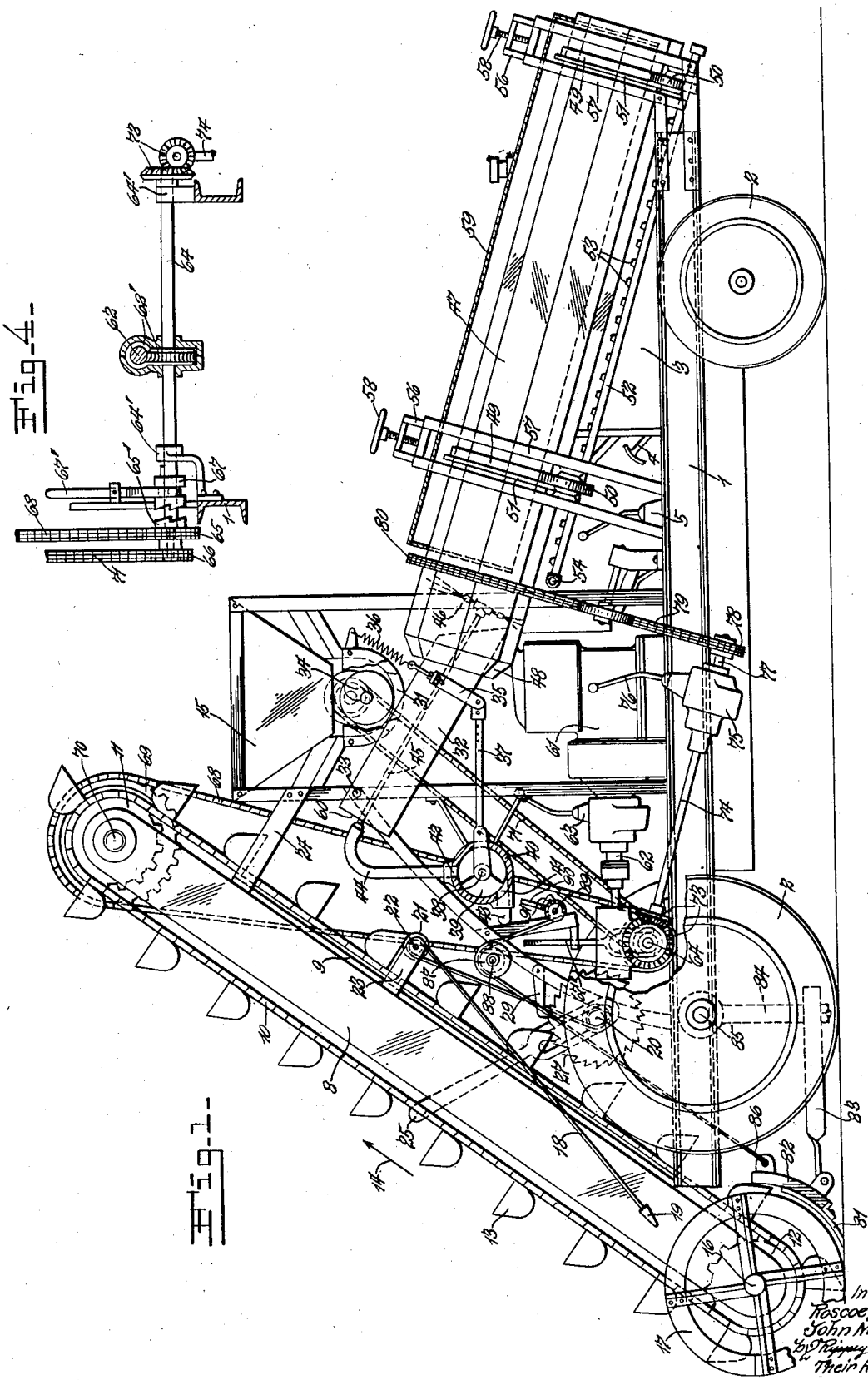

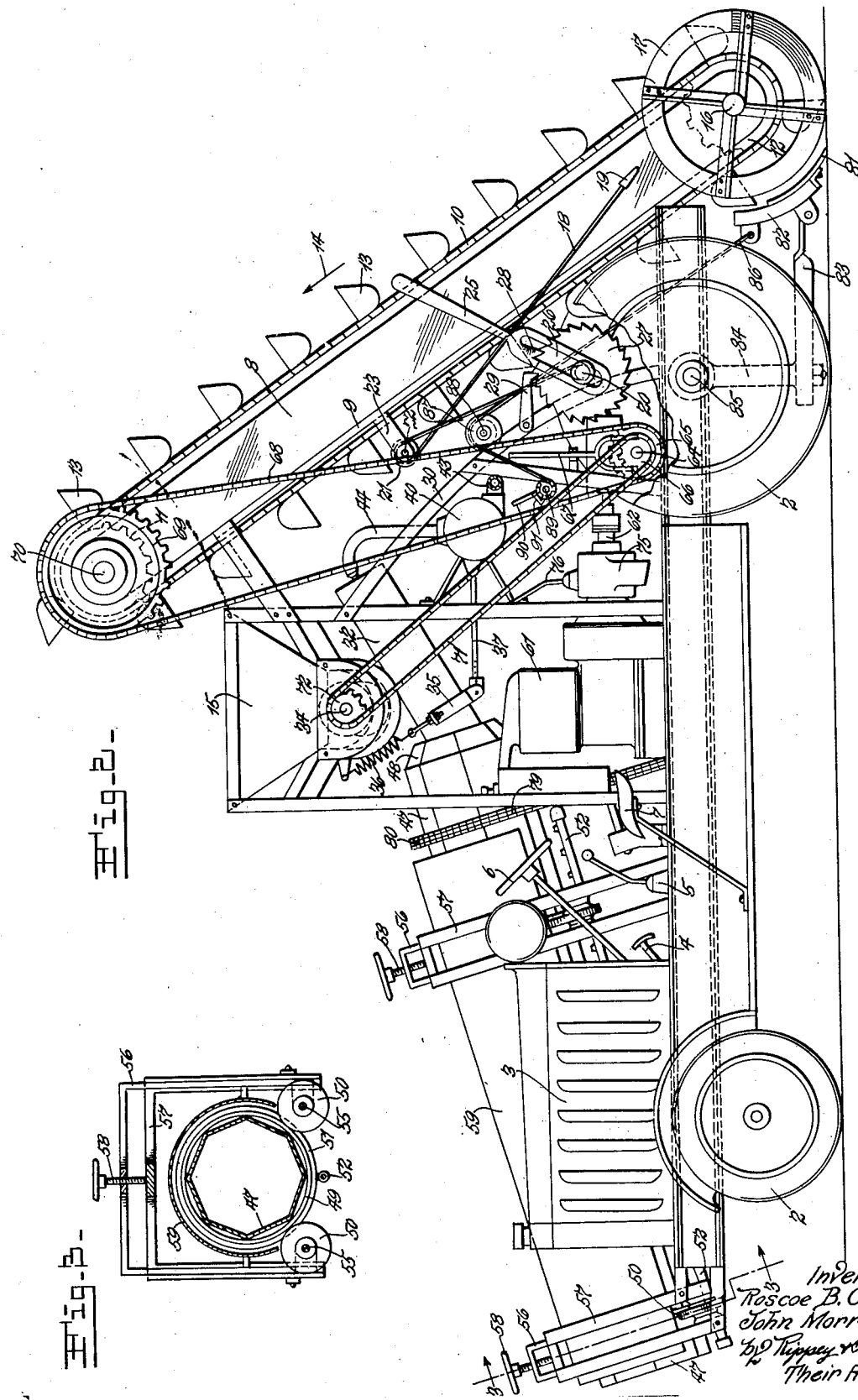

1,965,881

UNITED STATES PATENT OFFICE 1,965,881

PORTABLE ASPHALT MIXER

Roscoe B. Clark, St. Louis, and John Morrow, Russellville, Mo.

Application August 28, 1933, Serial No. 687,132

20 Claims. (Cl. 94—43)

This invention relates to a portable asphalt mixer, and an object is to provide an improved machine for mixing liquefied asphalt with granular materials in a more economical and facile manner than is possible by existing machines.

Another object of the invention is to provide an improved machine for mixing liquefied asphalt with granular materials including mechanisms for discharging the liquefied asphalt and the granular materials in an elongated rotating polygonal mixing chamber through and along which the mixture of liquefied asphalt and granular materials are moved and thoroughly mixed and discharged therefrom by gravity.

Another object of the invention is to provide improved mechanism for effecting the mixture of the liquefied asphalt and the granular materials.

Another object of the invention is to provide an improved machine for mixing the liquefied asphalt and granular materials to maintain an emulsified mixture under the influence of heat applied to the rotary mixing chamber through which the materials are caused to flow or move by gravity as an incident to rotation of said chamber.

Various other objects and advantages of our improved machine will be readily apparent from the following description, reference being made to the accompanying drawings, in which—

Fig. 1 is a side elevation of our improved machine with a few of the parts broken away and in section.

Fig. 2 is a side elevation opposite from that of Fig. 1, a few of the parts being broken away.

Fig. 3 is a cross sectional view of the mixer approximately on the line 3—3 of Fig. 2.

Fig. 4 is a cross sectional view of the frame of the machine showing the mechanism for driving the conveyor, the feed for the granular material and the mixer from a single shaft.

As shown, the supporting frame 1 is supported by wheels 2, the frame and wheels constituting a carriage or truck whereby the machine may be supported and conveniently moved from place to place. The machine may be propelled by a motor 3, conventionally shown in the drawings, and operatively connected with either the front wheels or the rear wheels, such connection being controlled by a clutch 4 and variable speed mechanism 5, all of familiar and conventional construction and, therefore, not shown in detail in the drawings. It is unnecessary to illustrate these driving connections from the engine 3 to the wheels because they are entirely familiar and require no illustration. Further, the vehicle thus provided may be steered and guided by the usual steering mechanism 6, a seat 7 for the operator being provided to support the operator in position whereby the controls 4, 5 and 6 may be conveniently operated.

At the rear of the machine a conveyor supporting frame 8 is mounted in an inclined position on an inclined support 9. The construction of this conveyor unit is familiar, a known and commercially available type of conveyor mechanism being shown. Generally, the conveyor comprises endless chains 10 engaging upper sprocket wheels 11 and lower sprocket wheels 12, so that the chain operates around the frame 8. The chain supports numerous scoops or buckets 13 whereby gravel, or other granular materials, may be conveyed upwardly by the scoops or buckets 13 in the direction of the arrow 14 and dumped or discharged by gravity into a hopper 15. The lower axle or rotary shaft 16 to which the sprocket wheels 12 are attached has on each extended end portion thereof a propeller device 17 whereby gravel, or other granular material, piled on the ground will be moved inwardly by each of the devices 17 to position to be scooped and received in the scoops or buckets 13.

This conveyor may be supported in different positions upwardly or downwardly along the support 9 by wire ropes 18, or other similar flexible connections, each having one end attached to an engageable portion 19 on one side of the frame 8, the opposite ends of said ropes or connections 18 being attached to a rotary shaft 20 while the intermediate portions of said ropes or connections pass over pulleys or sheaves 21 mounted on a shaft 22. This shaft 22 may be supported by arms 23 rigid with the support 9, said support 9 being rigidly supported by a frame structure 24. The shaft 20 may be rotated in a direction to wind the ropes or chains 18 thereon and thus raise the frame 8 and thereby the conveyor mechanism considerably above the ground, so that the machine may be propelled under its own power from place to place. A lever 25 (Fig. 2) has an elongated slot 26 through which the shaft 20 extends, thus permitting the lever to be moved endwise into and out of engagement with a ratchet wheel 27 attached to said shaft 20. A tooth 28 rigid with the lever 25 is engageable with and disengageable from the ratchet wheel 27 and, when said tooth is engaged with said ratchet wheel 27, the lever 25 may be operated to rotate the shaft 20 in a clockwise direction (Fig. 2) to wind the cables or chains 18 on said shaft, and thereby move the conveyor frame 8 upwardly to any proper position. A pawl 29 pivoted on a support 30 engages the ratchet wheel 27, and thereby holds the shaft in any of the positions to which said shaft is turned by operation of the lever 25.

The hopper 15 has a discharge opening 31 through the bottom thereof opening into a chute 32 having one end supported on a pivot 33. A screw propeller or conveyor 34 is mounted in the bottom of the hopper 15 and is rotative to discharge the granular material from the hopper through the hole 31 and to control and regulate the discharge of said granular material. A bracket 35 supports the lower end of the chute 32, said bracket being yieldingly supported by one or more springs 36. An arm 37 has one end pivoted to the bracket 35 and the opposite end attached to the extended stem 38 of a rotary valve 39 mounted in a valve housing 40 and controlling an inlet port 41 to said housing and an outlet port 42 from said housing. A pipe 43 opens into the port 41 and constitutes a passage for conducting liquid asphalt into the housing 40 for discharge therefrom through the outlet port 42 and thence through a pipe 44 extending toward the upper open end of the chute 32 and having an extension 45 through the chute 32 and provided on its lower end beyond the lower end of the chute 32 with one or more spray nozzles 46. By the connection 37 the valve 39 is operated in synchronism with the upward and downward swinging movement of the lower end of the chute 32. When the chute 32 is supported in its uppermost position by the spring 36, the inlet port 41 is partly open and will admit a predetermined amount and will discharge a predetermined amount of liquid asphalt into and through the valve housing 40 and thence through the pipes 44 and 45 to and through the nozzles 46. This predetermined amount of liquid asphalt that is discharged through the nozzles 46 is sufficient for mixture with the granular material discharged from the chute 32 when said chute is in its uppermost position. A greater amount of granular material discharged into the chute 32 will by its greater weight force the lower end of the chute 32 downwardly in opposition to the spring 36 and will thereby operate the valve 39 to open the port 41 to a greater extent and permit a greater amount of liquid asphalt to be discharged through the nozzles 46. It should now be clear that this operation of the chute 32 is effected automatically and as an incident to variation in the amount and weight of the granular material discharged into and through said chute and that the proper proportions of granular material and liquid asphalt for the proper mixture of these substances are automatically maintained.

From the chute 32 the granular material is discharged into an elongated rotative mixing drum 47 into which the lower end of the chute 32 extends. The upper end of the mixing drum 47 has an inwardly extended flange 48 which prevents any substantial amount of the material from working through and being discharged from the upper end of the mixing drum. A number of annular rails 49 surround and are attached to the mixing drum 47 and operate on rollers 50. Flanges 51 in connection with the rails 49 engage the rollers 50 and support the mixing drum 47 against downward longitudinal movement. An elongated burner device, comprising a tube 52 having burner jets or nozzles 53 opening therefrom toward the drum 47, is supported below and adjacent to said drum and receives fluid fuel, either gaseous or liquid, through a supply tube 54.

The rollers 50 are supported on axle members 55 (Fig. 3) carried by frames 56 adjustably supported in frames 57 rigid with the vehicle frame 1. Jack shafts 58 are screwed through the frames 56 and have their lower ends abutting against the upper portions of the frames 57. These jack shafts may be screwed to different adjustments to vary the relative positions of the frames 56 and thereby vary the angle of inclination of the mixing drum 47. The lower end of the mixing drum 47 is beyond the vehicle structure, so that the asphaltic mixture discharged from the mixing drum will not be discharged upon any portion of the vehicle.

A jacket 59 is mounted above and at the sides of the mixing drum above the heater 52 and functions to confine the heat about and adjacent to the drum in order to heat the asphaltic mixture in the drum to provide an emulsified mixture, or for other purposes.

Any amount of water desired or necessary to produce an emulsified mixture may be discharged into the mixing drum through a supply pipe 60.

The rotary shaft, driven by a motor 61 mounted on the frame 1, is engageable with and disengageable from a transmission shaft 62 by a clutch mechanism 63 of known or conventional construction. A transverse rotative shaft 64 mounted in bearings 64' is geared to the shaft 62 by gearing 62' and supports two sprocket wheels 65 and 66, the sprocket wheel 65 having a clutch hub 65'. These sprocket wheels are mounted loosely on said shaft 64.

A conventional clutch 67 mounted on the shaft 64 is shiftable by a lever 67' into and out of engagement with the clutch hub 65' to rotate the rigidly connected sprockets 65 and 66 by the shaft 64. A sprocket chain 68 is driven by the sprocket wheel 65 and engages a sprocket wheel 69 attached to the shaft 70 to which the sprocket wheels 11 are also attached. A sprocket chain 71 driven by the sprocket wheel 66 engages a sprocket wheel 72 attached to the end of the screw feeder device 34.

Gearing 73 (Fig. 1) drives a shaft 74 by the shaft 64. Variable speed gearing 75 of known or conventional construction and operative by a lever 76 in a known and conventional manner will drive a shaft 77 at selected speeds by rotation of the shaft 74 at one speed. A sprocket wheel 78 attached to the shaft 77 engages a chain 79 and said chain engages a sprocket wheel 80 attached to the mixing drum 47, so that said mixing drum may be rotated simultaneously with the operation of the conveyor mechanism and with the material feeder device in order to produce a proper mixture in the drum 47.

A scraper comprising a curved plate 81 is attached to supports 82 pivoted to the rear end of arms 83. The rear ends of the arms 83 are connected with posts 84 swinging from the rear axle structure 85 of the vehicle. Ropes or other flexible members 86 have their lower ends connected with the frame members 82. These ropes extend over sheaves 87 mounted on a shaft 88 and are attached to a rotary shaft 89. A lever 90 attached to the shaft 89 constitutes means for rotating said shaft to wind thereon the flexible connections 87 and thereby raise and support the scraper 81 above the ground or pavement. A ratchet device 91 constitutes means for holding the shaft 89 in position to which it is turned by the crank 90 and thereby supporting the scraper 81 above the ground.

In using this machine the engine 3 is operated in the familiar manner of automobile engines and controlled by the mechanisms 4, 5 and 6 and thereby driven and guided to any desired location as, for instance, against a pile of gravel, sand or other granular material. During travel of the vehicle from place to place, the conveyor mechanism, comprising the frame 8 and the mechanism mounted thereon, is supported in an elevated position by the connections 18 operated by rotating the shaft 20 by the lever 25 and held in different adjusted positions by the pawl 29 engaging the ratchet 27. And the scraper device 81 is also supported above the ground during travel of the vehicle by the connections 86 wound on the shaft 89. This permits the vehicle to travel from place to place without obstruction by the mechanism. During this travel of the vehicle, the engine 61 is idle or unoperated.

When the vehicle has been properly located adjacent to the pile of granular material the engine 3 may be stopped and the engine 61 may be operated. The conveyor mechanism may be lowered to position for operation by releasing the pawl 29 from the ratchet wheel 27 and the scraper device 81 may be lowered by releasing the detent device 91, so that when the vehicle is moved rearwardly by operation of the engine 3, the loose granular material will be scraped to position by the scraper 81 to be taken up by the buckets or scoops 13.

Then the engine 61 is started and the device 63 is operated to rotate the shaft 62 and thereby the shaft 64 at any desired speed. Then the clutch lever 67' is operated to engage the clutch 67 with the hub clutch member 65' to operate the conveyor mechanism, including the chains 10 and the buckets or scoops 13, to deliver the granular material into the hopper 15, and also to operate the screw feed device 34 to discharge the granular material at proper speed and in the proper amount into the chute 32 and thence into the rotary mixing drum 47.

The variable speed gear device 75 is also adjusted to rotate the drum 47 at any desired speed and, if desired, combustible fluid, either liquid or gaseous, may be delivered to the burner 52 and ignited at the ignition jets 53 to heat the material contained in the mixing drum 47 to maintain the emulsified mixture unsolidified and plastic as a partial result of the delivery of water into the heated mixture through the inlet 60.

The amount of liquid asphalt passing the valve 39 is controlled by the position of said valve and the position of said valve is controlled by the amount of granular material discharged into the chute 32 by the screw feed device 34, so that when a greater amount of granular material is discharged into the chute 32, the valve 39 will be operated to increase in proportion the amount of liquid asphalt delivered thereto. Extent of vertical swinging movement of the chute 32 is slight and is permitted by proper adjustment of the adjacent end of the rotary drum 47. The drum 47 may be supported in different angles of inclination merely by adjusting the members 58.

It must now be apparent that this invention obtains all of its intended objects and purposes in a highly efficient and satisfactory manner and can be varied widely within the scope of equivalent limits without departure from the nature and principle thereof. We contemplate such variations as may be within the scope of our invention.

We claim:

1. A machine for mixing liquid asphalt and granular material comprising a rotary mixing drum, mechanism for delivering granular material into said drum, means for discharging liquid asphalt into said drum for mixture with the granular material, and means operated by said mechanism for regulating the amount of liquid asphalt that is discharged into said drum in proportion to the amount of granular material delivered into said drum.

2. A machine of the character described comprising a receptacle for receiving granular material and liquid asphalt, means for moving said receptacle to mix the granular material and the asphalt, mechanism for delivering granular material into said receptacle, means for conducting liquid asphalt to said receptacle for mixture with the granular material therein, and means operated by said mechanism for varying the amount of said asphalt delivered to said receptacle in proportion to the weight of granular material delivered into said receptacle.

3. A machine of the character described comprising a receptacle adapted to receive granular material and liquid asphalt, mechanisms for delivering into said receptacle from separate sources of supply granular material and liquid asphalt and for varying the amount of liquid asphalt in proportion to the weight of the granular material that is delivered into said receptacle, and mechanism for imparting motion to said receptacle to mix the asphalt and the granular material therein.

4. A machine of the character described comprising a rotary receptacle that is polygonal in cross section, mechanisms for delivering into said receptacle granular material and liquid asphalt from separate sources of supply, mechanism for rotating said receptacle at selected speeds, and means for varying the amount of liquid asphalt delivered into said receptacle in proportion to the weight of granular material that is delivered into said receptacle.

5. A machine of the character described comprising a rotary receptacle that is polygonal in cross section, mechanisms for delivering into said receptacle granular material and liquid asphalt from separate sources of supply, mechanism for rotating said receptacle at selected speeds, means for varying the amount of liquid asphalt delivered into said receptacle in proportion to the weight of granular material that is delivered into said receptacle, means for mixing water with the granular material and asphalt, and means for heating said receptacle.

6. A machine of the character described comprising an elongated receptacle rotative about its longitudinal axis and being polygonal in cross section, means for supporting said receptacle at different selected angles of inclination, mechanism for rotating said receptacle, and mechanisms for delivering into said receptacle from separate sources of supply measured quantities of granular material and liquid asphalt during rotation of said receptacle.

7. A machine of the character described comprising an elongated receptacle rotative about its longitudinal axis and being polygonal in cross section, means for supporting said receptacle at different selected angles of inclination, mechanism for rotating said receptacle, mechanisms for delivering into said receptacle from separate sources of supply measured quantities of granular material and liquid asphalt during rotation of said receptacle, and means controlling simultaneous operation of said last named mechanisms.

8. In a machine of the character described, a rotary mixing receptacle, a pivoted chute for discharging granular material into said receptacle, a spring supporting one end portion of said chute, mechanism for delivering granular material into said chute to be conducted thereby into said receptacle and for moving said chute in opposition to said spring in proportion to the weight of said granular material, means for discharging liquid asphalt into said receptacle for mixture with said granular material, and means operated by said chute for varying the amount of liquid asphalt that is discharged into said receptacle in proportion to the movement of said chute by said granular material.

9. In a machine of the character described, a rotary mixing receptacle, a pivoted chute for discharging granular material into said receptacle, a spring supporting one end portion of said chute, mechanism for delivering granular material into said chute to be conducted thereby into said receptacle and for moving said chute in opposition to said spring in proportion to the weight of said granular material, means for discharging liquid asphalt into said receptacle for mixture with said granular material, means operated by said chute for varying the amount of liquid asphalt that is discharged into said receptacle in proportion to the movement of said chute by said granular material, and mechanisms for simultaneously rotating said chute and operating said first named mechanism.

10. A machine of the character described comprising a receptacle adapted to receive granular material and liquid asphalt, mechanisms for delivering into said receptacle from separate sources of supply measured quantities of granular material and liquid asphalt and for varying the amount of asphalt in proportion to the weight of the granular material that is delivered into said receptacle, a conveyor for delivering granular material to that one of said mechanisms which delivers granular material into said receptacle, and means for operating said mechanisms and said conveyor simultaneously.

11. A machine of the character described comprising a receptacle adapted to receive granular material and liquid asphalt, mechanisms for delivering into said receptacle from separate sources of supply granular material and liquid asphalt and for varying the amount of liquid asphalt in proportion to the weight of the granular material that is delivered into said receptacle, driving connections for operating said receptacle to mix the granular material and the asphalt, and means for controlling the speed of operation of said connections and thereby the speed of operation of said receptacle.

12. A machine of the character described comprising mechanism for mixing granular material and asphalt, devices for delivering granular material from one source of supply to said mechanism, connections for discharging asphalt into said mechanism for mixture with said granular material, and means operated by said devices for varying the amount of asphalt discharged into said mechanism in proportion to the weight of the granular material discharged into said mechanism.

13. A machine of the character described comprising mechanism for mixing asphalt and granular material, a chute for conducting granular material into said mechanism, means for discharging asphalt into contact with said granular material, and connections operated by said chute for varying the amount of asphalt that is discharged into contact with said granular material.

14. A machine of the character described comprising mechanism for mixing asphalt and granular material, connections for operating said mechanism, devices for conducting granular material into said mechanism, means for discharging asphalt into contact with said granular material, and devices controlled by the granular material moving toward said mechanism for regulating the amount of asphalt that may be discharged into contact with said granular material.

15. A machine of the character described comprising separate mechanisms for conducting granular material and asphalt into contact with each other from separate sources of supply, and means operated by said mechanism that conducts said granular material for regulating the amount of asphalt passing into contact with said granular material.

16. A machine of the character described comprising separate mechanisms for conducting granular material and asphalt into contact with each other from separate sources of supply, means operated by said mechanism that conducts said granular material for regulating the amount of asphalt passing into contact with said granular material, and mechanism for agitating the mixture of asphalt and granular material to complete the mixture thereof.

17. A machine of the character described comprising separate mechanisms for conducting granular material and asphalt into contact with each other from separate sources of supply, means operated by said mechanism that conducts said granular material for regulating the amount of asphalt passing into contact with said granular material, mechanism for agitating the mixture of asphalt and granular material to complete the mixture thereof, and means for wetting and heating said mixture to form an emulsion.

18. A machine of the character described comprising a mixer, mechanism for operating said mixer, a device for conducting granular material into said mixer, connections for conducting asphalt into said mixer in contact with the granular material, and means controlled automatically by the granular material for regulating the amount of asphalt that may be conducted into contact with said granular material.

19. In a machine of the character described, an elongated polygonal mixing chamber rotative about its longitudinal axis, means for supporting said mixing chamber at different angles of inclination, a chute for discharging granular material into said mixing chamber, means pivotally supporting said chute adjacent to the end thereof opposite from said mixing chamber, mechanism for discharging granular material into said chute, connections for conducting asphalt into contact with said granular material, and means operated by said chute regulating the amount of asphalt that may pass into contact with said granular material.

20. A machine of the character described comprising a mixer, a mechanism for conducting granular material into said mixer, a mechanism for conducting asphalt into contact with said granular material, and connections operated by one of said mechanisms for regulating the amount of material that may be conducted by the other mechanism.

ROSCOE B. CLARK.
JOHN MORROW.